(12) United States Patent
Mund et al.

(10) Patent No.: US 8,805,078 B2
(45) Date of Patent: Aug. 12, 2014

(54) METHODS FOR DIGITAL MAPPING AND ASSOCIATED APPARATUS

(75) Inventors: Heiko Mund, Hildesheim (DE); Oleg Schmelzle, Laatzen (DE)

(73) Assignee: TomTom Germany GmbH & Co. KG, Harsum (DE)

( * ) Notice: Subject to any disclaimer, the term of this patent is extended or adjusted under 35 U.S.C. 154(b) by 175 days.

(21) Appl. No.: 13/577,707

(22) PCT Filed: Feb. 8, 2010

(86) PCT No.: PCT/EP2010/051494
§ 371 (c)(1),
(2), (4) Date: Aug. 21, 2012

(87) PCT Pub. No.: WO2011/095227
PCT Pub. Date: Aug. 11, 2011

(65) Prior Publication Data
US 2012/0308135 A1    Dec. 6, 2012

(51) Int. Cl.
*G06K 9/34* (2006.01)

(52) U.S. Cl.
USPC ........... 382/177; 382/170; 382/171; 382/190; 258/537; 258/538; 258/462

(58) Field of Classification Search
USPC ................. 382/170, 171, 177, 190, 278, 282; 358/537, 538, 462
See application file for complete search history.

(56) References Cited

U.S. PATENT DOCUMENTS

| | | | | |
|---|---|---|---|---|
| 5,948,040 A | * | 9/1999 | DeLorme et al. | 701/426 |
| 6,798,374 B1 | * | 9/2004 | Smith | 342/109 |
| 7,287,984 B2 | * | 10/2007 | Sweeney | 434/112 |
| 7,545,952 B2 | * | 6/2009 | Brundage et al. | 382/100 |
| 7,577,244 B2 | * | 8/2009 | Taschereau | 379/218.01 |
| 2007/0140595 A1 | | 6/2007 | Taylor et al. | |
| 2008/0002914 A1 | | 1/2008 | Vincent et al. | |

FOREIGN PATENT DOCUMENTS

| | | |
|---|---|---|
| WO | 2005066882 A1 | 7/2005 |
| WO | 2007045272 A1 | 4/2007 |

OTHER PUBLICATIONS

International Search Report issued Oct. 5, 2010 for International Application No. PCT/EP2010/051494.

* cited by examiner

*Primary Examiner* — Yosef Kassa

(57) ABSTRACT

A method comprises extracting a local identifier (130, 730a, 730b) from an image (100, 500, 700), the image (100, 500, 700) also having positional data (120) relating to the location at which the image (100, 500, 700) was captured; and associating the extracted local identifier (130, 730a, 730b) with the corresponding positional data (120) to allow for associating the extracted local identifier with a digital map (300, 600, 800).

9 Claims, 4 Drawing Sheets

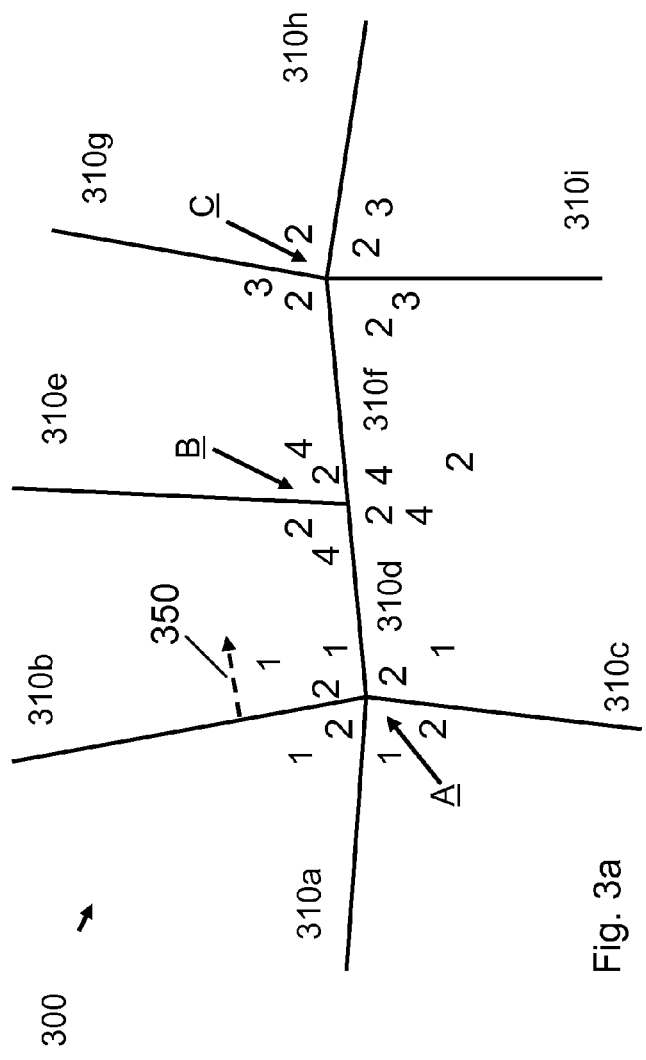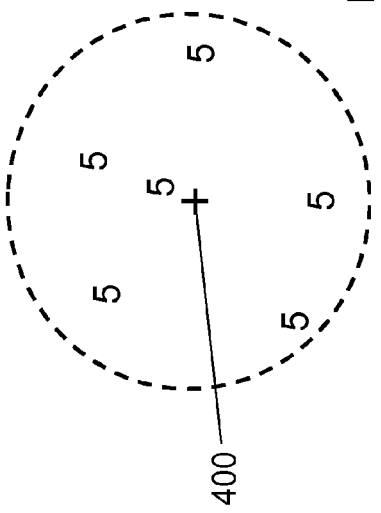
Fig. 3a
Fig. 3b

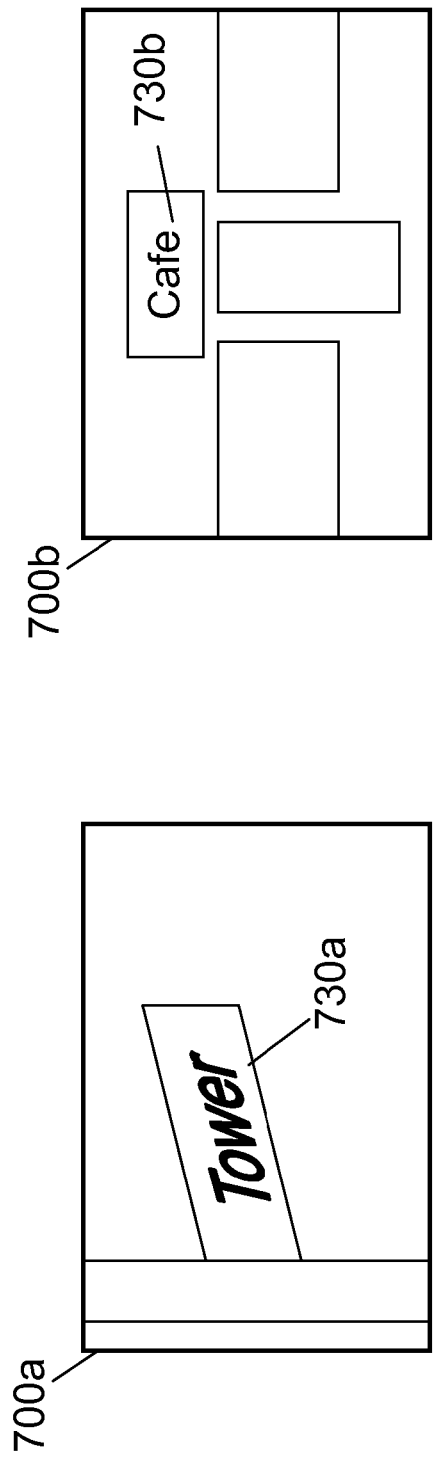
Fig. 5b
Fig. 5a
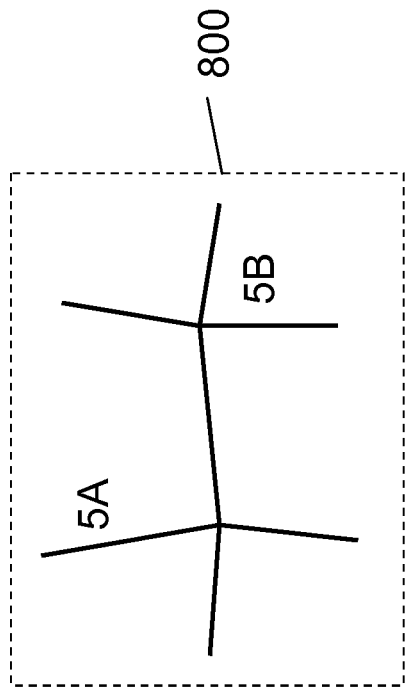
Fig. 5c

METHODS FOR DIGITAL MAPPING AND ASSOCIATED APPARATUS

This application is the National Stage of International Application No. PCT/EP2010/051494, filed on 8 Feb. 2010, and designating the United States. The entire content of this application is incorporated herein by reference.

FIELD OF THE INVENTION

The invention relates to a method and apparatus for associating local identifiers, such as street names or the like, with digital maps. In particular, but not exclusively, the invention relates to a method of extracting local identifiers from images and associating extracted local identifiers with positional data for subsequent use with digital maps, as well as associated databases, apparatus and further associated methods.

BACKGROUND

Portable computing devices, for example Portable Navigation Devices (PNDs) or other navigation or mobile devices, that include GPS (Global Positioning System) signal reception and processing functionality are well known and are employed to assist with navigation and/or monitoring movement. Such devices may be handheld in use, may be configured for use in a cradle, or may be configured to be comprised with a vehicle, or the like.

Maps for use with such devices are often referred to as digital maps, and comprise a plurality of segments. Broadly speaking, each segment is representative of a street. The location of a device may be represented with respect to segments on a digital map. Digital maps can be used in a variety of applications, as well as or instead of for navigation.

Digital maps can include further information in addition to the layout of streets or segments making up streets, and that further information (for example street names or locations of points of interest) can be useful to a user and/or for a navigation process. However, reliable further information can be time consuming and difficult to obtain (for example requiring intervention or selection by a human operator) and subject to change or error.

SUMMARY

According to a first aspect there is provided a method comprising:
  extracting a local identifier from an image, the image also having positional data relating to the location at which the image was captured; and
  associating the extracted local identifier together with the corresponding positional data to allow for associating the extracted local identifier with a digital map.

The local identifier may comprise text. The local identifier may comprise a street name. The local identifier may comprise one or more of: building name; building number; business name; sign information, such as points of interest (e.g. airport, cathedral, etc.), place names (e.g. town, or city names, etc.).

The extracted local identifier may be associated together with the corresponding positional data to allow for associating the extracted local identifier with one or more segments of a digital map.

The extracted local identifier may be extracted from the image by using pattern and/or character recognition, such as optical character recognition, intelligent character or word recognition, or the like. The extracted local identifier may be extracted from image data, the image data being usable to reconstruct the image (e.g. usable by a user interface, printer, etc.). The extracted local identifier may be extracted by determining text or shapes from the image data.

The method may comprise modifying the image before extracted the local identifier. Modifying the image may be to remove or reduce distortion. The image may be deskewed.

The positional data may comprise data relating to global navigation satellite system data, such a Global Position System data, Galileo data, or the like. The positional data may comprise pseudolite data. The positional data may comprise co-ordinates, such as local or global co-ordinates. The positional data may comprise data relating to longitude and/or latitude. The positional data may comprise altitude. The positional data may comprise time data.

The positional data may comprise cellular network data, such a base station IDs, timing advance data/distances, or the like. The positional data may comprise local wireless network data, such as wireless SSIDs.

The positional data may comprise bearing data, the bearing data relating to the bearing at which the image was taken. The bearing data may comprise data relate to the angle at which the image was taken (e.g. from the azimuthal, meridian (e.g. North 40 degrees), etc.).

The positional data may comprise precision data relating to the precision of the positional data and/or bearing data. The precision data may comprise dilution of precision data, such as horizontal, vertical, positional (e.g. 3D), and/or temporal dilution of precision data. The precision data may comprise data relating to the quality of signal used to provide the positional data.

The positional data may comprise the speed data. The speed data may comprise the Doppler speed. The speed data may comprise the instantaneous speed. The speed data may comprise average speed.

The method may comprise extracting a plurality of local identifiers from an image. The method may comprise extracting one or more local identifiers from a plurality of images, and associating the extracted local identifiers together with corresponding positional data to allow for associating the extracted local identifiers with a digital map (e.g. segments of a digital map).

The image may be a still image or picture, such as that captured by a camera. The image may be a frame from a sequence of images, such as those provided with a video or media clip.

According to a second aspect there is provided a method comprising:
  using an extracted local identifier and associated positional data according to any of the features of the first aspect, and associating the extracted local identifier with a digital map.

That is to say that the method may comprise associating an extracted local identifier with a digital map, wherein the extracted local identifier has been associated with positional data according to any of the features of the first aspect.

The extracted local identifier may be associated with one or more segments of the digital map. The extracted local identifier may be associated with one or more segments of the digital map by determining that the associated positional data of that particular extracted local identifier is within a distance from the one or more segments. The distance may be predetermined. The distance may be considered to be a threshold, or the like. Different segments may have different thresholds. Some or all segments may have the same threshold.

The method may comprise using a plurality of extracted local identifiers and associated positional data. The method may comprise determining one or more clusters of extracted local identifiers. Each cluster may be associated with a common or similar extracted local identifier (e.g. common or similar name, number, shape, etc.). Each cluster may have a similar extracted local identifier that is similar within a particular similarity threshold. For example, sufficiently similar extracted local identifiers may be considered to be same, such as Bothwell St., Bothwell Street, and Buthwell Street.

Each cluster may be associated with one or more particular segments by determining that the corresponding positional data of the common or similar extracted local identifier is within a predetermined distance from one or more segments.

Each cluster may be formed by determining that the corresponding positional data of particular extracted local identifiers is within a predetermined distance from other common or similar particular local identifiers. Clusters may be formed by using a density based algorithm. Clusters may be formed by using a grid based algorithm. Such clusters may then be associated with one or more segments, for example, because a central point of the cluster is within a particular distance from a segment, or because the innermost/outermost extracted local identifier is within a distance from a segment, or the like.

The method may comprise determining a street name of a particular segment of the digital map by using the common extracted local identifier of one or more clusters associated with that particular segment. A segment name may be considered to be the same as that of a common extracted local identifier of an associated cluster.

Determining a street name of a particular segment may be achieved by determining that two or more clusters having a common or similar extracted local identifier are associated with the same particular segment. The method may comprise associating the common or similar extracted local identifier of the two or more clusters with the street name of the particular segment.

The method may comprise determining further street names of other segments by using the determining street name of one or more particular segments.

Determining of one or more further street names may be achieved by using one or more determined street names together with the common or similar extracted local identifier of one or more further clusters (e.g. by a process of elimination).

One or more extracted local identifiers may be associated with one or more segments of the digital map by using a determined orientation of the extracted local identifier(s). The determined orientation may determined from the bearing data of the corresponding image, and/or the amount of modification of the image. For example, the orientation of the local identifier may be determined by using the bearing data and the amount of deskewing required.

Local identifiers determined to be orientated parallel, substantially parallel, along or the like, particular segments of a digital map may be considered to be associated with those segments. The name of a particular segment may be taken to be the name of the local identifier orientated with respect to that segment. For example, the name of a particular segment may be taken to be the name of the local identifier orientated substantially parallel to that segment and within a particular distance from that segment.

According to a third aspect there is provided a method comprising:
  determining or verifying street names for segments of a digital map by using the method according to any of the features of the second aspect.
The segments may be derived from probe data, or the like.

According to a fourth aspect there is provided a computer program element comprising computer program code to make a computer execute the method of any of the features of the first, second or third aspects.

The computer program element may be embodied on a computer readable medium.

According to a fifth aspect there is provided a digital map comprising one or more associated extracted local identifiers, each extracting local identifier having been extracted from an image and having been associated with the digital map by using corresponding positional data related to a location at which the image was captured.

The digital map may comprise a plurality of segments, each segment representative of a street. Some or all of the segments may be associated with the one or more extracted local identifiers. Each extracted local identifier may have been associated with one or more of the plurality of segments by using corresponding positional data related to a location at which the image was captured.

The segments may be derived from probe data, or the like.

According to a sixth aspect there is provided apparatus, such as portable apparatus, comprising one or more digital maps according to any features of the fifth aspect.

According to a seventh aspect there is provided apparatus comprising a database of extracted local identifiers having been extracted from images, the extracted local identifiers associated with corresponding positional data relating to the location at which each image was captured, the database usable to allow for associating extracted local identifiers with one or more segments of a digital map.

The local identifier may comprise a street name. The local identifier may comprise one or more of: building name; building number; business name; sign information, such as points of interest (e.g. airport, cathedral, etc.), place names (e.g. town, or city names, etc.).

The apparatus may be remotely accessible in order to allow for associating extracted local identifiers with one or more segments of a digital map. The apparatus may be accessible by using a network, which may be wired, wireless or combination thereof. The apparatus may be accessible using the Internet. The apparatus maybe accessible by using a cellular network.

The apparatus may be comprised with a device, such as a portable device. The device may be configured for navigation functionality. The device may be configured for cellular functionality.

According to an eighth aspect there is provided a method comprising accessing apparatus according to any of the features of the seventh aspect. The method may comprise using associating extracted local identifiers of the database to determine or verify one or more segments of a digital map.

According to a ninth aspect there is provided a method comprising:
  extracting a local identifier from an image, the image also having positional data relating to the location at which the image was captured; and
  associating the extracted local identifier with the corresponding positional data of the image.

According to a tenth aspect there is provided a method comprising:
  extracting a indicia from an image, the image also having positional data relating to the location at which the image was captured; and
  associating the extracted indicia with the corresponding positional data of the image.

Associating of the extracted indicia together with the corresponding positional data may allow for associating the extracted indicia with a digital map, such as one or more segments of a digital map.

The extracted indicia may comprise a street name. The extracted indicia may comprise a business name. The extracted indicia may comprise a building number.

The indicia may comprise text. The indicia may comprise a shape. The extracted indicia may provide a point of interest.

According to an eleventh aspect there is provided a method comprising:
 determining identifiable location data relating to a street name from a frame or picture by using character detection, the frame or picture also containing supplementary location specific data relating to the geographical position at which the frame or picture was captured; and
 determining a name of one or more streets of a digital street plot by using the determined identifiable location data along with the location specific data.

The frame or picture may be from a sequence of frames. The street plot may be a digital map. The identifiable location data may comprise the name of a street, or the like.

According to a twelfth aspect there is a method comprising:
 extracting a means for identifying a locality from an means for an image, the means for an image also having data means for determining the location at which the means for an image was captured; and
 associating the extracted means for identifying a locality together with the corresponding data means for determining location to allow for associating the extracted means for identifying a locality with one or more means for representing streets on a means for a map.

According to a thirteenth aspect there is provided a computer program element comprising computer program code to make a computer execute the method of any of the features of the eighth, ninth, tenth, eleventh, or twelfth aspects.

The computer program element may be embodied on a computer readable medium.

According to a fourteenth aspect there is apparatus configured to store one or more images having positional data relating to a location at which each image was captured, the apparatus configured to extract local identifiers from images, and associate extracted local identifier together with corresponding positional data.

The apparatus may be configured to modify, such as de-skew, the images to allow for extracting local identifiers.

The apparatus may allow for associating extracted local identifier with a digital map, such a segments of a digital map.

According to fifteenth aspect there is provided apparatus comprising:
 an extractor configured to extract local identifiers from images received from an image store; and
 an associator in communication with the extractor and configured to associate extract local identifiers with corresponding positional data received from an image store.

The extractor may be configured for character or pattern recognition. The extractor may be configured for use optical and/or intelligent character recognition.

The apparatus may be comprised with the image store. The apparatus/image store may be comprised with a device.

The associator may be configured to communicate associated extracted local identifiers and positional data to a database (e.g. for storage, to allow for subsequent use (e.g. with a digital map), etc.).

The database may be comprised with the apparatus.

The invention includes one or more corresponding aspects, embodiments or features in isolation or in various combinations whether or not specifically stated (including claimed) in that combination or in isolation. Corresponding means for performing one or more of the discussed functions are also within the present disclosure.

Any feature in one aspect may be applied to any other aspect, in any appropriate combination. For example, apparatus or system features may be applied as method features and vice versa.

It will be appreciated that one or more embodiments/aspects may be useful in providing for determining and/or verifying street name of one or more segments of a digital map.

The above summary is intended to be merely exemplary and non-limiting.

BRIEF DESCRIPTION OF THE DRAWINGS

At least one embodiment of the invention will now be described, by way of example only, with reference to the accompanying drawings, in which:

FIG. 3 shows a portion of a digital map having segments, and spatially located clusters of extracted street names;

FIG. 5 shows further exemplary images comprising local identifiers; and

DETAILED DESCRIPTION OF SPECIFIC EMBODIMENTS

Figure 1:
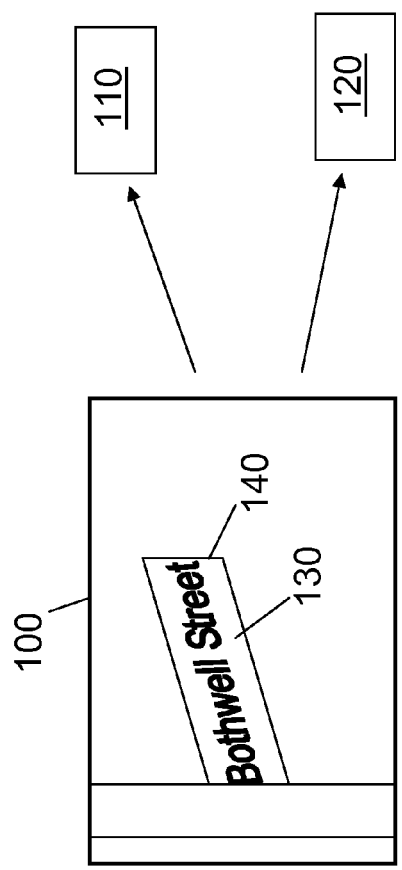
FIG. 1 shows an example of an image comprising a local identifier.

FIG. 1 shows an exemplary image 100. The image 100 may be a picture, such as that taken from a camera, or may be a frame from a series of images, such as that provided as part of a media or video clip.

The image 100 comprises image data 110 and positional data 120. The image data 110 is usable to allow reconstruction of the image 100, for example, by using a printer, multimedia device, user interface, or the like. The positional data 120 relates to the location at which the image 100 was captured. In this regard, the image 100 may be considered to be geo-tagged.

It will be appreciated that such tagging of the image 100 with positional data 120 may be achieved by a device, such as a camera or the like, with a receiver configured to receive signals associated with the location of the device. An example would be a camera comprised with a Global Navigation Satellite System receiver, or a cellular device in communication with a base station, or the like. Upon capturing the image 100 such a device may be configured to associate received positional data with the image data.

Of course, in a further example, a user may provide and/or associate their own positional data 120 with a captured image (e.g. by manually tagging the image themselves).

In this example, the positional data 120 of the image 100 comprises data relating to global co-ordinates derived from Global Navigation Satellite System data, such as data received from Global Positioning System signals, or Galileo signals, or the like.

Table 1 shows exemplary positional data.

TABLE 1

| Positional Data | 55.853015, −4.226172 |
|---|---|

In this example, the positional data 120 is provided along with the image data 110 for further use. Alternatively, positional data 120 may be provided such that it is merely associated with the image data 100. That is to say that in some examples the positional data 120 may be stored separately/remotely from the image data 110, but nonetheless be associated with the image data 110.

It can be seen from FIG. 1 that the image 100 itself shows a local identifier 130. The local identifier 130 is associated with the location at which the image 100 was captured. In this example, the local identifier 130 is a street name, which is presented on a street sign 140. The representation of the local identifier 130 has been skewed due to the direction at which the image 100 was captured, with respect to the street sign 140. While the local identifier 130 is shown to be represented substantially on the image 100, this is exemplary only.

Here, the identifier 130 is extractable from the image 100. In this example, the identifier 130 can be extracted by using pattern recognition. Such pattern recognition may be used with the reconstructed image 100, or with the image data 110 itself. Exemplary pattern recognition includes: optical character recognition, intelligent character or word recognition, or the like.

In some examples, the identifier 130 is extractable by having a knowledge, or estimate, of the location or region at which the image 100 was captured. For example, if it is determined or known that the image 100 was captured in Munich, Germany, rather than Boston, Mass., then the local identifier 130 can be extractable by looking for patterns of font and/or shape of text used with signs in Munich, rather than the patterns associated with the font and/or shape of text used with signs in Boston.

After a local identifier 130 has been extracted from the image 100 (i.e. the reconstructed image 100, or the image data 110), then it can be associated with the corresponding positional data 120. Table 2 shows exemplary association of an extracted local identifier 130 and positional data 120.

TABLE 2

| Local Identifier | Bothwell Street |
|---|---|
| Positional Data | 55.853015, −4.226172 |

In such a manner, the extracted one or more local identifiers can be associated together with the corresponding positional data 120 from one or more images 100. This may allow for associating extracted local identifiers with one or more segments of a digital map, as will be described.

It will readily be appreciated that the same methodology may be applied when the image comprises a plurality of local identifiers 130. In which case, each local identifier can be associated with the same positional data 120.

Similarly, it will be appreciated that in some examples, the image 100 or image data is modified in some manner in order to assist with extracting the local identifier 130. For example, in some cases, the image 100 is de-skewed to remove the skewed effect of the text of the sign, before the local identifier 130 is extracted. In other examples, the brightness and/or contrast, etc. may be modified in order to assist with extracting the local identifier 130. In some examples, the image may be modified to remove distortion.

Figure 2:
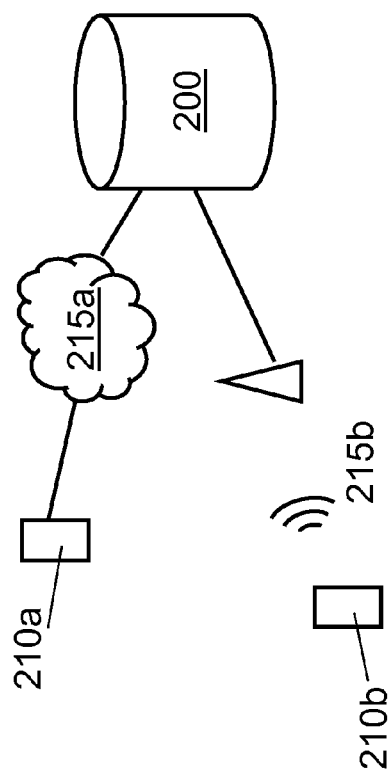
FIG. 2 shows an example of a database comprising extracted local identifiers and positional data.

Consider now a database as shown in FIG. 2. The database 200 may be provided by a processor and memory, configured in a known manner. For the purposes of example, consider that the database 200 is in communication with a first device 210a via a network 215a, such as the Internet. The database 200 is also in communication with a second device 210b via a wireless network, such as a cellular network.

In this example, the first device 210a is a personal computer. The first device 210a is configured to extract local identifiers 130 from images 100 and associate the extracted local identifiers 130 with corresponding positional data 130 of each image 100. The images 100 stored with the first device 210a may have been received from a camera, video device, or the like. The first device 210a is configured to communicate extracted local identifiers 130 and associated positional data 120 to the database 200.

The second device 210b is a portable media device, such as a cellular telephone, Portable Navigation Device, or the like. The second device 210b comprises image capturing functionality, such as a camera, along with a Global Positioning System (GPS) receiver. The second device 210b is configured to communicate a captured image 100 along with corresponding positioning data 120 received from the GPS receiver to the database 200. In turn, the database 200 having received the image 100 from the second device 210b, is configured to extract the local identifier 130 and associate the extracted local identifier 130 with the corresponding positional data 120.

In each case, the database 200 is configured to store extracted local identifiers 130 with corresponding positional data 120.

Table 3 shows an example of information stored by the database 200.

TABLE 3

| Extracted Local Identifier | Associated Positional Data |
|---|---|
| Bothwell Street | 55.853015, −4.226172 |
| St. Peter's Lane | 55.804111, −4.226203 |
| Douglas Street | 55.797223, −4.225008 |
| Waterloo Street | 55.784219, −4.225145 |

In this example, the database 200 is accessible for use by a user or other apparatus. In some examples, the database 200 is accessible for use with a digital map, as will be described. It will be appreciated that the database 200 can be comprised with further apparatus, and that further apparatus may have additional functionality.

Of course, a skilled reader will fully appreciate that in the above example, both devices 210a, 210b may be configured to extract local identifiers 130 from images 100 and associate them with positional data 130 locally. That is to say, each device 210a, 210b may be configured associate extract local identifiers 130 from images 100 with corresponding positional data 120 before communicating the associated extracted local identifier 130 with corresponding positional data 120 to the database 200.

Alternatively, neither device may be configured to extract local identifiers and/or associate those extracted local identifier with the corresponding positional data 120. In such cases, the database 200 may be configured to extract and/or associate the relevant data.

Although two devices 210a, 210b are shown it will be appreciated that this is exemplary only. In some cases, a plurality of devices 210*a*, 210*b* may be used. Alternatively, or additionally, the image data 110 and positional data 120 may be provided from a further database, such as an existing database comprising geo-tagged images 100. Such a further database may have uses in addition to providing the database 200 with geo-tagged images 100.

FIG. 3*a* shows an exemplary portion of a digital map 300. The map 300 comprises a plurality of segments 310*a*-310*i*. Each segment 310*a*-310*i* is representative of a road or street, or the like. In this example, the segments 310*a*-310*i* are derived from probe data. That is data that has been accumulated from one or more receivers, such as GPS receivers, provided with one or more vehicles. An example of where probe data can be obtained is from GPS receivers fitted to company fleet vehicles. In such cases, the probe data is the cumulative data accrued from some or all of the fleet vehicles.

Because the probe data comprises information about the location of vehicles, it is possible to generate a digital map of likely roads, streets, etc. The more probe data that is collected, the more chance that all the streets or roads in a particular area will be mapped with segments. Of course, such generated digital maps are devoid of street names, or other local information.

By using the database 200 described above, it is possible to populate the street names of the digital map 300, as will be described.

FIG. 3*a* shows also a plurality extracted local identifiers 130 that have been extracted from images 100. Common or similar extracted local identifiers 130 are represented by a common number. For brevity, these have been denoted as 1, 2, 3 and 4. In this case, 1, 2, 3 and 4 are all representative of street names (e.g. 1=Bothwell Street, 2=Douglas Street, 3=Waterloo Street, 4=St. Peter's Lane).

Each extracted local identifier 130 is shown as being spatially located on the digital map 300 according to the corresponding positional data 120. As can be seen, extracted local identifiers 130 have a tendency to be positioned at the crossing between segments. Street signs can often be found at such locations.

The digital map 300 shown in FIG. 3*a* shows three such crossings, which are denoted A, B and C.

Extracted local identifiers 130 are associatable with one or more segments 310*a*-310*i* based on a distance 350 of the corresponding positional data 130 from the one or more segments 310*a*-310*i*.

In this example, the distance 350 used is predetermined. The distance 350 can be considered to be a threshold distance. In that regard, extracted local identifiers 130 having the same or similar local identifier can be considered to be clustered with one or more segments 310*a*-310*i*.

Table 4 shows clusters with associated segments, as exemplified in FIG. 3.

TABLE 4

| Cluster | Associated Segment(s) |
|---|---|
| 1 | 310a, 310b, 310c, 310d |
| 2 (at A) | 310a, 310b, 310c, 310d |
| 2 (at B) | 310d, 310e, 310f |
| 2 (at C) | 310f, 310g, 310h, 310i |
| 3 | 310f, 310g, 310h, 310i |
| 4 | 310d, 310e, 310f |

In this instance, there are three clusters with the same name (2=Douglas Street). However, each are distinct clusters because they fall within different distances from particular segments.

In some examples, clusters can be determined additionally or alternatively by grouping same or similar extracted street names all within a particular distance from one another. For example, extracted local identifiers 130 that are within a mutual distance from one another can be clustered, which in some cases is irrespective of the distance to one or more segments. FIG. 3*b* shows an example of such a cluster having similar local identifiers that are denoted 5.

Such clustering may use density based, or grid based algorithms, or the like. Common or similar extracted street names within a particular distance or threshold from one another, or spatial distribution with respect to one another, can be grouped as a cluster.

In some examples, these clusters are then associated with one or more segments based on the distance of some property of the cluster to the segment. For example, in some cases, the clusters are associated with a segment when a centre point 400 of the cluster is within a particular threshold distance of a segment.

It will also be appreciated that clustering of local identifiers 130 may not be solely based on the same local identifiers 130, but may cluster similar identifiers 130. In some examples, clusters are formed where local identifiers 130 are within a distance (e.g. from one or more segments, and/or spatially distributed with respect to one another, etc.), and where each identifier 130 is sufficiently similar.

An example of being sufficiently similar is when the text of one particular identifier 130 differs by only a few characters from another identifier 130. Such identifiers can be considered to be within a similarity threshold. Using a similarity threshold allows for identifiers 130 to be clustered even though all the lettering, etc. is not identical. This may occur when one particular sign reads "Street", while another reads "St." for brevity. Similarly, this may allow for clustering local identifiers 130 in which the full name has been missed or occluded in an image 100.

Of course, it is also possible to associate the local identifier 130 with the segments 310*a*-310*i* before clustering. In such cases, it is possible to transfer the association of identifier 130/segment to the respective cluster. In some embodiments, the clusters are then associated with the all segments having being associated with an identifier of that cluster. In other embodiments, the clusters are associated with one or some of the segments having being associated with an identifier of that cluster (e.g. the segment to which the majority of local identifiers have been associated).

The converse of Table 4 allows for each segment to be associated with one or more clusters, as is shown in Table 5.

TABLE 5

| Segment | Associated clusters |
|---|---|
| 310a | 1, 2 (at A) |
| 310b | 1, 2 (at A) |
| 310c | 1, 2 (at A) |
| 310d | 1, 2 (at A), 4, 2 (at B) |
| 310e | 4, 2 (at B) |
| 310f | 4, 2 (at B), 3, 2 (at C) |
| 310g | 3, 2 (at C) |
| 310h | 3, 2 (at C) |
| 310i | 3, 2 (at C) |

As can be seen, each segment 310*a*-310*i* is associated with two or more different extracted street names. However, segment 310*d* is associated with two clusters having the same extracted local identifier 130. As a result, it is possible to determine that the segment 310*d* is likely to have the street name of those two clusters, which in this instance is the common street name of 2 (Douglas Street). By using the same approach, it is possible to determine that segment 310*f* is likely to have also the street name of 2 (Douglas Street).

By using this information it is possible to exclude the other street names for segments 310*d* and 310*f*. Table 6 shows a modified version of Table 4 in which segments 310*d* and 310*f* have been resolved.

TABLE 6

| Cluster | Associated Segment(s) |
| --- | --- |
| 1 | 310a, 310b, 310c, |
| 2 (at A) | 310a, 310b, 310c, 310d |
| 2 (at B) | 310d, 310e, 310f |
| 2 (at C) | 310f, 310g, 310h, 310i |
| 3 | 310g, 310h, 310i |
| 4 | 310e |

Therefore, it is apparent that segment 310*e* can be determined to have the street name associated with cluster 4 (St. Peter's Lane). Table 7 shows a table of the allocation of street names to segments.

TABLE 7

| Segment | Associated clusters |
| --- | --- |
| 310a | 2 or 1 |
| 310b | 1 or 2 |
| 310c | 1 or 2 |
| 310d | 2 |
| 310e | 4 |
| 310f | 2 |
| 310g | 3 or 2 |
| 310h | 2 or 3 |
| 310i | 3 or 2 |

In this example, the segments 310*a*-310*i* are not, in all cases, associated with a unique street name. Nonetheless, it is possible with knowledge of the continuation of the network, or with some heuristic assumptions (e.g. overall distance from particular segments, etc.) to determine a unique street name for each segment 310*a*-310*i*.

In some examples, the positional data further comprises bearing data and/or speed data and/or precision data. The bearing data relates to the bearing at which the image 100 was captured (e.g. the direction from which the image was taken). The speed data (e.g. Doppler speed, etc) relates to the present speed of a device capturing the image 100. These may be provided from data from an inertial navigation/sensor system, or the like. The precision data relates to the precision of the positional data. Examples included dilution of precision data (horizontal, vertical, etc.), quality of signal (QoS) data, or the like. This further data may be used in order to determine a unique street name of a segment.

For example, the bearing data can be used to determine the bearing at which the image was captured. This can be used along with the measure of modification used (e.g. amount of distortion corrected for, or need for de-skewing of the image) to determine the orientation of the local identifier 130, with respect to the bearing. This, in effect, provides an orientation of the local identifier 130 that can be represented on a digital map. In many instances, street signs are positioned such that they are orientation along the street (i.e. parallel, or substantially parallel to the street) to which they are associated.

In such embodiments, it is possible to associate a particular extracted local identifier 130 with one or more segments 310*a*-310*i* by additionally or alternatively using the determined orientation of the local identifier 130.

Similarly, by way of example, the precision data may be used such that local identifiers associated with positional data having a better QoS, or the like, are given better weighting when deriving street names.

It will readily be appreciated that in addition to street names with segments of a digital map, such as that provided by probe data, the above method can also be used to verify existing street names of a digital map. In those examples, determined and existing street names may be compared to confirm that they are accurate. In some examples, the positional data further comprises time data. The time data related to the date and/or time at which the image was captured. Such information may be usable to determine whether the associated extracted local identifier is up to date. In the case when a determined street name differs from an existing street name of a digital map, the existing street name may only be modified if the time data associated with the determined street name is within a particular time threshold.

Figure 4:
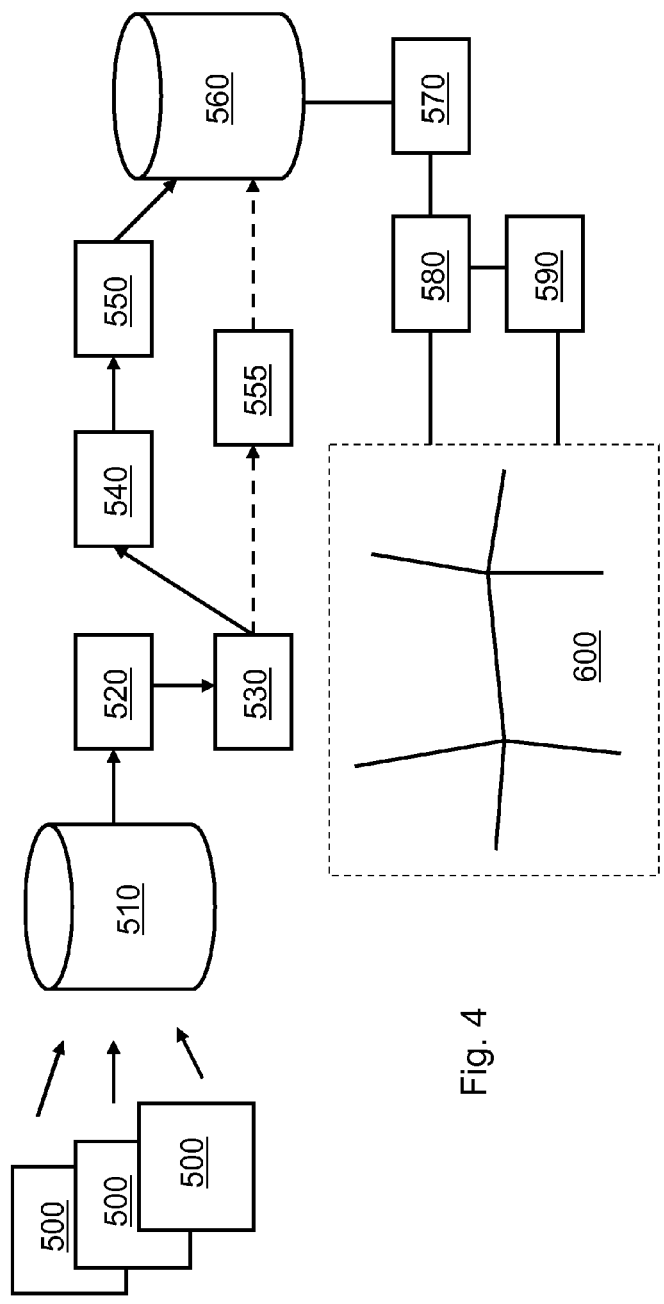
FIG. 4 shows a simplified representation of determining or verifying street names of a digital map.

FIG. 4 shows a simplified representation of determining or verifying street names of a digital map. A plurality of images 500, each similar to that described above, are stored in an image database 510. Each image 500 has image data, which may or may not have a local identifier, and associated positional data. Therefore, each image 500 stored the image database 510 can be considered to be geo-tagged.

For each image 500 it is possible to determine 520 whether or not that image contains a local identifier. If the image 500 contains a local identifier, then the image can be modified (e.g. de-skewed) to help with extracting the identifier. Of course, the identifier may be extracted without modification. In this example, each image is de-skewed 530, if necessary, before using optical character recognition 540 and then intelligent characters recognition 550 in order to extract one or more local identifiers from each image 500.

After a local identifier has been extracted, it is then associated with the corresponding positional data and stored in a street name database 560. In some examples, the stored positional data stored in the street name database 560 is supplemented by data relating to the direction of a sign in an image 500. This may be achieved by using 555 bearing data of image and/or the amount of de-skew required of an image. Such supplemental data may be used when later determining the name of one or more segments, as will be appreciated.

Each street name being the same or similar name can then be clustered 570 based on the positional data, in a similar manner to that described above. Each cluster can be allocated 580 to one or more segments of a digital map 600, and as such, street names can be allocated to one or more segments.

As explained above, in some example, the street names are clustered 570 based on the positional data without knowledge of the segments of digital map 600. That is to say that common or similar extracted local identifiers all within a particular distance (e.g. spatial distance) from one another can be clustered in order to be used subsequently to determine segment names of the digital map 600.

While the above examples have been exemplified by having street names as local identifiers, it will readily be appreciated that local identifiers may comprise other indicators of a locality that can be associated with a digital map. For example, consider the images 700*a* and 700*b* shown in FIGS. 5*a* and 5*b*. Each image 700*a*, 700*b* comprises a local identifier 730*a*, 730*b* that is specific to the location at which each image 700*a*, 700*b* was captured. In FIG. 5*a*, the image 700*a* comprises a sign denoting a Point of Interest (PoI), which in FIG. 5*b* shows a building above the door of which reads Café.

In a similar manner to that described above these local identifiers 730*a*, 730*b* can be extracted from the images 700*a*, 700b and associated with positional data for use, for example, with a digital map 800. FIG. 5c shows an exemplary digital map 800 along with the local identifiers 730a, 730b. Of course, it will be appreciated that such extracted local identifiers 730a, 730b need not be for association with segments as such, but rather only with location or position on a map, as is. In addition, such associated extracted local identifiers and positional data may not be for association with a digital map, but may merely be stored on a database, similar to those described above.

In which case the database can be assessable in order to allow a user to query a location or local identifier. For example, a user may request the database to provide a list of cafes within a particular distance from a location.

Figure 6:
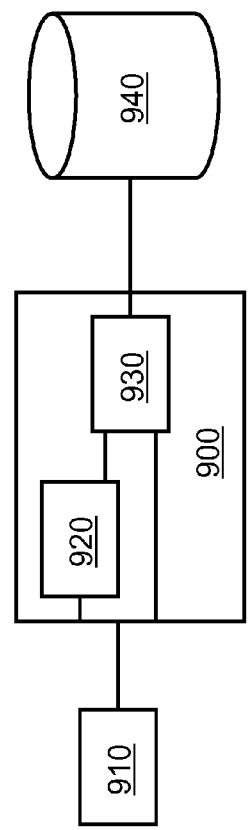
FIG. 6 shows an apparatus for extracting local identifier.

FIG. 6 shows an embodiment of apparatus 900 for use in extracting local identifiers 130 from images 100. The apparatus 900 is configured to be in communication with an image store 910 that can be used to store one or more images 100. Of course, in some embodiments, the apparatus 900 may be comprised with the image store 910. The image store 910 may be comprised with a device, such as those described in relation to FIG. 2, or may be a database assessable via a network, for example.

Some or all of such images 100 stored by the image store 910 can comprise local identifiers 130 (e.g. street names, place names, etc.). The apparatus 900 comprises an extractor 920. The extractor 920 is configured to communicate with the image store 910 to receive either the image data 110 of images, or the image itself, and to extract local identifiers 130. In this example, the extractor 920 is configured to use optical character recognition. Here, the extractor 920 is further configured to modify each image 100 prior to extracting a local identifier (e.g. de-skew). In some embodiments the extractor 920 can be considered to be an image scanner using text recognition.

The apparatus 900 further comprises an associator 930. The associator 930 is in communication with the image store 910 and configured to receive positional data 120 corresponding to each image 100. The associator 930 is further in communication with the extractor 920 and configured to receive extracted local identifiers 130 and associate them with corresponding positional data 120. The associator 930 is configured to communicate the associated extracted local identifiers 130 and positional data 120 to a database 940 for storage, and to allow for subsequent use (e.g. with a digital map). In some examples, the database 940 is comprised with the apparatus 900.

It will readily be appreciated that the apparatus 900 may comprise a processor and memory, configured in a known manner. The apparatus 900 may be provided by an application specific integrated circuit, field programmable gate array, programmable intelligent computer, or the like. In that regard, the apparatus 900 may comprise hardware, firmware and/or software. In some examples, the apparatus 900 is configured when in an enabled state, or when loaded with software in order to provide the extractor 920/associator 930, and optionally the image store 910 and/or database 940.

It will be appreciated that the apparatus 900 may be provided with a device, such as a Portable Navigation Device, which has further functionality in addition to the use as extracting local identifiers 130.

It will be appreciated that while various aspects and embodiments of the invention have been described, the scope of the invention is not limited to the particular arrangements set out herein and instead extends to encompass all arrangements, and modifications and alterations thereto, which fall within the scope of the appended claims.

For example, although the above embodiments have been described in the context of GPS, it should be noted that devices/methods may utilise any kind of position sensing technology as an alternative to (or indeed in addition to) GPS in order to provide positional data. For example, the devices/methods may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by using one or more ASICs (application specific integrated circuit)) or indeed by a mix of hardware software, and/or firmware. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time. It will be understood that various omissions and substitutions and changes in the form and details of the devices and methods described may be made by those skilled in the art.

The invention claimed is:

1. A method of associating information with a digital map comprising:
    extracting at least one local identifier from at least one image, the at least one image also having positional data; and
    determining the location of each of the at least one extracted local identifier using the positional data of the corresponding image;
    creating at least one cluster of common or similar extracted local identifiers based on at least one of:
    (i) the distance of the extracted local identifiers from each other; and
    (ii) the distance of the extracted local identifiers from one or more segments of the digital map; and
    associating the at least one cluster with at least one segment of the digital map.

2. The method according to claim 1 wherein the extracted at least one local identifier is a street name.

3. The method according to claim 1 wherein the at least one extracted local identifier is extracted from the at least one image by using character recognition.

4. The method according to claim 1, wherein the positional data comprises data relating to one or more of:
   global navigation satellite system data;
   cellular network data;
   local wireless network data; and
   pseudolite data.

5. The method according to claim 1,
   wherein the at least one cluster is further based on the orientation of the at least one extracted local identifier.

6. The method according to claim 1, wherein the segments of the digital map are derived from probe data.

7. A non-transitory computer readable medium comprising computer program code to make a computer execute the method as claimed in claim 1.

8. A digital map created using the method of claim 1.

9. An apparatus for associating information with a digital map comprising:
   a processor configured to:
      extract at least one local identifier from at least one image, the at least one image having positional data relating to the location at which the image is captured;
      determine the location of each of the at least one extracted local identifiers using the positional data of the corresponding image;
      create at least one cluster of common or similar extracted local identifiers based on at least one of:
      (i) the distance of the extracted local identifiers from each other; and
      (ii) (ii) the distance of the extracted local identifiers from one or more segments of the digital map; and
      associate the one or more clusters with at least one segment of the digital map.

\* \* \* \* \*